Patented July 26, 1938

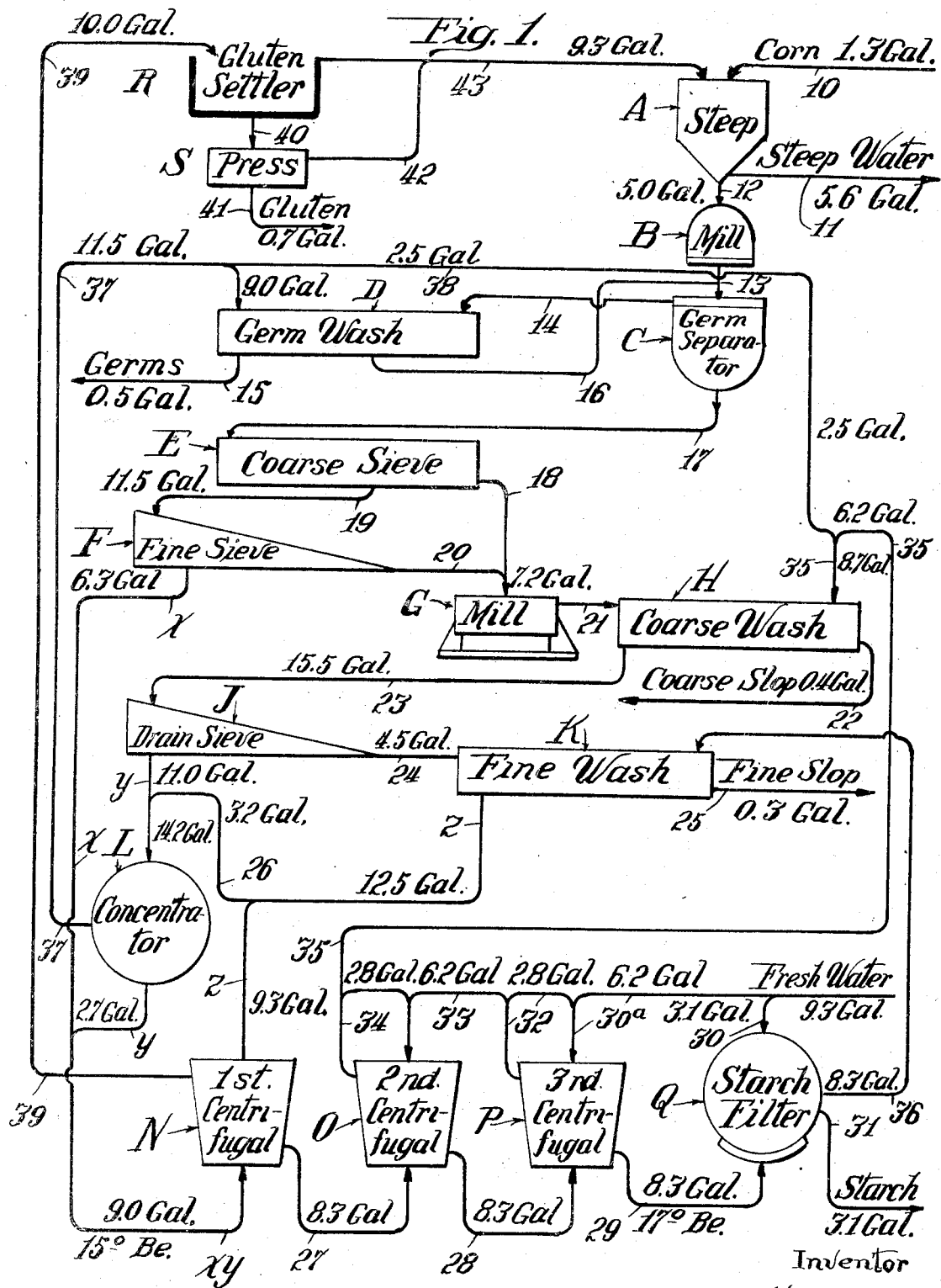

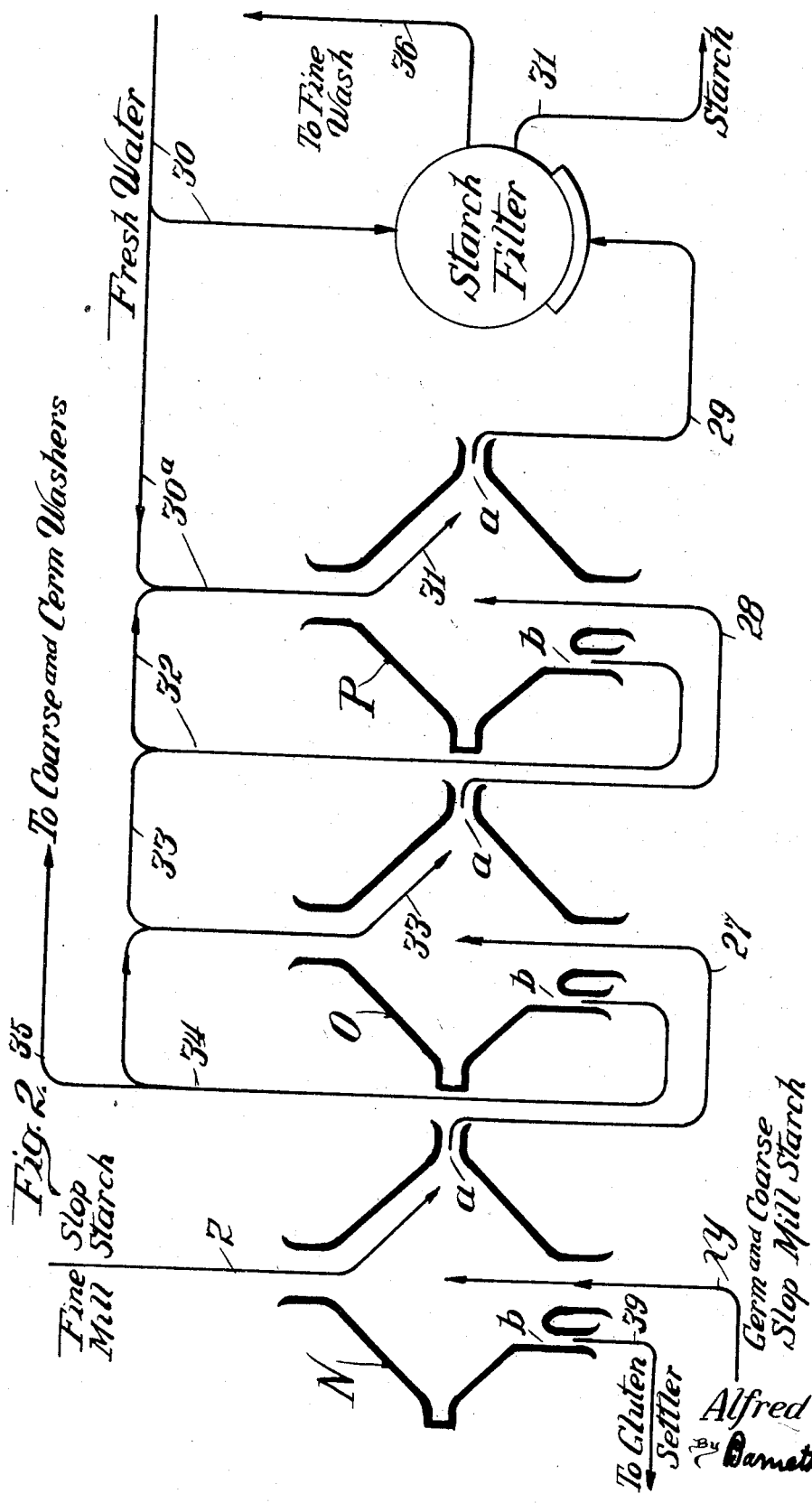

2,124,779

UNITED STATES PATENT OFFICE 2,124,779

MANUFACTURE OF STARCH

Alfred H. Kelling, Oak Park, Ill., assignor to International Patents Development Company, Wilmington, Del., a corporation of Delaware Original application June 5, 1933, Serial No. 674,365. Divided and this application June 4, 1936, Serial No. 83,540

15 Claims. (Cl. 127—68)

This invention relates to the manufacture of starch from corn by the wet method; and in particular to a process in which all, or substantially all, of the process waters (except the steep water and the water absorbed in the discharged solids) are used back in the process for the purpose of saving substances, soluble and insoluble, contained therein and preventing the pollution of streams which results if these process waters are discharged from the factory.

In the manufacture of starch from corn by the wet method it has been customary to steep the corn, comminute it, and subject it to separating operations in water for removing the germs, bran and fiber. These separating operations yield streams of mill starch, so called, consisting of thin mixtures of starch, gluten and water; and it has been the usual practice to cause the mill starch to be passed over starch tables on which the starch is deposited and from the ends of which the gluten and major portion of the water tail off. The starch is then removed from the tables, usually by flushing, and is dewatered and washed with fresh water in washing filters. The water containing the gluten is allowed to stand in gluten settlers for the recovery of the gluten. The process waters from the starch washing operation and from the gluten settlers are returned to the system for re-use in the operations upon the corn material subsequently treated therein.

The water used for steeping the corn is withdrawn to evaporators in order to recover the soluble substances therein which have value as a constituent of cattle food and for other purposes.

In copending application of Alfred H. Kelling, Serial No. 675,412, filed June 12, 1933, and in application Serial No. 674,365, filed June 5, 1933, of which the present case is a division, methods are disclosed for using in a particularly advantageous manner, centrifugal machines for effecting the separation between the starch and gluten that has heretofore been accomplished by the tabling operation. According to these inventions the centrifugal machines and the other instrumentalities for carrying out the process, are arranged so that, in the first place, all process waters may be re-used in the process, (except for the steep water and the water absorbed in the discharged solids); and, in the second place, the process water which is most highly infected with micro-organisms and which contains the largest amount of soluble substances, and other impurities, specifically the water from the gluten settlers, may be used exclusively in the steeping operation, that is in the stage of the process from which solubles are withdrawn for recovery; while the other process waters, which have less opportunity to stand and develop micro-organic activity than the gluten water and which contain smaller quantities of soluble substances and other impurities, are re-used in the later stages of the process, to wit, in the germ and coarse and fine slop separating operations. Furthermore, the centrifuging of the mill starch is carried out in such a manner that soluble substances are eliminated from the process waters subsequently used in the separating operations and are concentrated in the water to be sent to the steeps. As a result contamination of the starch through soluble impurities including color substances and micro-organic activity is minimized, the washing of the starch facilitated and a purer starch obtained, since the impurities resulting from micro-organic activity, particularly, appear to be of a colloidal character which makes them difficult, if not impossible, to remove by ordinary washing operations, even when repeated. Moreover, a whiter starch is obtained since the impurities which are concentrated in the process water that is used exclusively for steeping include the substances which tend to give corn starch a yellowish tinge. No inconvenience is experienced in returning to the steeps a water more or less highly infected with micro-organisms and containing relatively large quantities of solubles. The steeping operation is performed on the corn material in the form of unbroken grain not particularly susceptible to organic activity or to the presence of soluble impurities in the steep water. The steeping is carried on at relatively high temperatures and in the presence of considerable quantities of sulphur dioxide and these factors inhibit micro-organic activity. The separating operation—the germ, coarse slop and fine slop separations—are, on the contrary, carried out at relatively low temperatures and with relatively small sulphur dioxide concentration and moreover the material is in a finely divided state peculiarly susceptible to micro-organic activity and to contamination by soluble impurities. The quality of the starch is therefore much improved by keeping the operations subsequent to steeping as free as possible from micro-organisms, products of micro-organic activity and soluble and colloidal impurities.

In application 674,365, of which the present application is a division, the light starch and gluten liquor from the fine slop wash (fine slop mill starch) is used as a washing or counter-current liquid in the first centrifugal; the centrifuging operation being preferably a multiple stage operation with the centrifugals arranged on the counter-current principle. Fresh water is used as a wash liquid in the later stages of the centrifuging operation, the overflow from the first centrifugal going to the steeping system, through the settler, in part at least; while the overflow from the second centrifugal is returned to the fine slop wash to be used as a wash water. By this arrangement the water used in the first centrifugal for displacing the water in the mill starch, which latter contains a large quantity of soluble substances, is a water having a low solubles content, due to the fact that the fine slop is washed with water from the later centrifugal operations which use fresh water as a wash or counter-current liquid. Hence the solubles are, to a large extent, crowded, so to speak, into the overflow from the first centrifugal, the water of which is used primarily, at least, in the steeps.

In the process disclosed in Fig. 1 of application 674,365, a certain amount of gluten settler water is used in the separating operations for the reason that there is more of this process water than can be economically used for steeping. In Fig. 2 of application 674,365, which discloses the subject matter of the present divisional application, certain arrangements are provided whereby all of the gluten settler water goes to the steeps, none being used in the germ, coarse slop or fine slop separating operations.

The invention claimed herein is illustrated in the appended drawings in which

Fig. 1 is a flow sheet diagram of the process as a whole; and

Fig. 2 is a more detailed diagram of the centrifugal system.

In Fig. 1 the numerals followed by the abbreviation "gal." represent the gallons of water present per bushel of corn ground. The indicated water balance is of course purely illustrative and subject to variation and modification. The term "pipe" as used herein is intended to include any suitable conduit, conveyor or other means for conducting the material or liquids from point to point in the system. The term "slop" is intended to include the hull fragments, fiber and other cellulosic constituents of the corn. The invention is not confined to any particular form of apparatus. The representation of apparatus in the drawings is wholly diagrammatic. Single units are shown where in actual practice there will be perhaps quite a large number of units in parallel.

Referring first to Fig. 1 of the drawings: A designates the steeping system which ordinarily consists of a plurality of steep tanks operated on the counter-current principle; B the mill for breaking up the steeped corn to free the germs; and C the germ separator. The germs floated off from the liquid in separator C are washed in the germ washing system D which comprises a series of shaking sieves and/or reels. The rest of the grain from the bottom of separator C is screened through coarse sieve E and fine sieve F and the tailings from both sieves are ground in mill G. H represents the coarse slop wash or separating system, comprising a series of copper covered reels and/or shakers, for separating starch and gluten from the material ground in the mill G, by what may be considered a washing of the slop; J a drain sieve for separating the fine slop particles from the starch milk flowing from the coarse slop wash H; and K the fine slop wash, comprising a series of silk covered reels and/or shakers for washing the starch and gluten from the fine slop removed by drain sieve J. N, O and P are centrifugals, of which there may be any number, for effecting a separation as between starch and gluten. Q is a filter for dewatering and washing the starch. R represents a gluten settler and S a press for pressing out water from the gluten removed from the settler R.

In the description of the operation of the process, which follows, reference will be made to the connections between the several instrumentalities referred to above.

*Operation of process.*—The corn containing 1.3 gallons of water enters the steeping system A at 10 and 5.6 gallons of steep water are drawn off at 11 and sent to the evaporators (not shown). The steeped corn carrying 5.0 gallons of water enters the mill B through pipe 12 and the broken up material passes to the germ separator C through pipe 13. The germs are floated off from the separator C and pass through pipe 14 to the germ wash D. The washed germs are discharged from the washing system D at 15 with 0.5 gallon of water. Starch milk from the germ system D passes through pipe 16 to the separator C to maintain in the separator a proper amount of separating fluid of the right density. The rest of the corn passes from the separator C through pipe 17 to the coarse sieve E, the tailings from which pass through pipe 18 to the mill G while the liquid passes through pipe 19 to the fine sieve F. The liquid from the fine sieve F, consisting of 6.3 gallons of water carrying starch and gluten in suspension, passes into the pipe $x$, leading to the centrifugal system. The tailings from the fine sieve F pass through pipe 20 to pipe 18 and thence through mill G, 7.2 gallons of water entering the mill with the corn material. The material fine ground in mill G passes through pipe 21 to the coarse wash H, from which the coarse slop is discharged at 22 carrying 0.4 gallon of water. The liquid from the coarse wash H, 15.5 gallons, passes through pipe 23 to the drain sieve J. The liquid (mill starch) from the drain sieve J enters a pipe $y$, the amount being 11.0 gallons. The tailings from the drain sieve J, containing 4.5 gallons of water, pass through pipe 24 to the fine wash K from which the fine slop is discharged at 25 containing 0.3 gallon of water. The mill starch from the fine wash K (12.5 gallons) enters the pipe $z$.

Arranged in pipe $y$ between the drain sieve J and the junction of pipe $y$ with pipe $x$, is a concentrator L which may consist of the settling tank but is preferably a filter, the purpose of which is to extract water from the mill starch issuing from the coarse slop system. A certain amount of mill starch from the fine slop system is also sent to the concentrator L through pipe 26 which is a branch from pipe $z$. The amount of mill starch going to the concentrator L is 14.2 gallons, 11.0 gallons from the coarse slop system and 3.2 gallons from the fine slop system. The concentrator L extracts 11.5 gallons of water from the mill starch treated therein and delivers the concentrated material containing 2.7 gallons into pipe $y$.

The mill starch thus concentrated to a density of about 15° Baumé is introduced into the first centrifugal N through pipe designated $xy$. The underflow from centrifugal N, 8.3 gallons, and containing principally starch, passes through pipe 27 to the second centrifugal O. The underflow from centrifugal O passes through pipe 28 to the third centrifugal P, the amount being 8.3 gallons; and the underflow from centrifugal P, 8.3 gallons with a density of about 17° Baumé, passes through pipe 29 to the starch filter Q. Here the starch is first dewatered and then washed with 3.1 gallons of fresh water entering through pipe 30. The starch is discharged through pipe 31 with 3.1 gallons of water. If desired, the starch may be washed repeatedly in two or more filters.

12.5 gallons of mill starch light in solubles and containing a relatively small quantity of insolubles, are discharged from the fine slop system K through pipe z. 3.2 gallons of this liquid is sent to the concentrator L, as described, and the remainder, 9.3 gallons, goes through pipe z to the first centrifugal, where it is used as a wash water.

Preferably the wash water for the centrifugals O and P is fresh water. By fresh water is intended either tap water or water which contains a very small amount of solids, soluble or insoluble.

In the arrangement shown 6.2 gallons of fresh water are introduced into centrifugal P through pipe 30a which is a branch of the fresh water line 30. The overflow from centrifugal P in pipe 32 divides, 2.8 gallons being returned to the centrifugal P and 6.2 gallons going through pipe 33 to the centrifugal O. The overflow from centrifugal O passes into pipe 34, 2.8 gallons going back to the centrifugal O and the rest entering pipe 35.

Preferably the fresh water introduced into the centrifugal P enters the underflow or starch zone of the centrifugal machine. Similarly the overflow from centrifugal P to centrifugal O enters the starch zone of centrifugal O; and the starch liquor from the fine slop system K which is introduced into the first centrifugal N, enters the underflow or starch zone of the centrifugal.

In Fig. 2 a designates the starch zones of the several centrifugals and b the overflow outlets from the overflow or gluten zones. As a result the solubles are concentrated in the overflow from each machine so that the underflow, carrying the starch, is relatively free of solubles. This concentration takes place partly through dilution of the material in the starch zone, but in part through the principle of displacement since the entering starch milk splits off water containing solubles before mingling with wash water in the starch zone. The concentration actually obtained in practice cannot in fact be accounted for, mathematically, on the basis of dilution alone.

In the arrangement shown in connection with centrifugals O and P, the concentration of solubles in the overflow is reduced, due to the recycling of the overflow, in part, through pipes 32, 34. The purpose of the recycling is to increase the dilution in centrifugals O and P, in order to repeat the separation as of starch from gluten, which is rendered somewhat more difficult because of the use of a water containing both starch and gluten—the z stream from the fine slop system—in the first centrifuging operation at N. If the starch discharged to the filter Q through pipe 29 contains too high a content of solubles, it may be given a second washing operation in another filter.

However, by using fresh water in centrifugal P and re-using the filtrate from Q low in impurities for the fine wash and using the light starch liquor from the fine wash for displacing, in centrifugal N, the water in the mill starch, which is heavily charged with solubles because it comes largely from the germ system, the underflow from the first centrifugal to the second centrifugal will contain such a small quantity of solubles that it is feasible to use the circulatory system connected with centrifugals O and P and still reduce the solubles in the starch going to the starch filter Q sufficiently so that these solubles can be adequately removed at Q.

The process waters are returned to the process in the following manner: The filtrates and wash water from starch filter Q, 8.3 gallons, are returned through pipe 36 to the fine wash. This water will contain a minimum quantity of solubles and hence is used in the last of the separating operations. The overflow from the second centrifugal O, (6.2 gallons) which contains the next smallest quantity of solubles, is returned to the coarse wash H. The water extracted from the mill starch by the concentrator L, 11.5 gallons, contains a somewhat larger quantity of solubles and 9.0 gallons of this water passes through pipe 37 to the germ wash D, 2.5 gallons going through pipe 38 to the coarse wash H.

The process water which has the highest solubles content, the overflow from the first centrifugal N passes through pipe 39 to the settler R, the amount being 10.0 gallons. The gluten from settler R passes through pipe 40 to press S, from which the gluten is discharged at 41 with 0.7 gallons of water, the water from the press passing through pipe 42 to a pipe 43 which carries the water from the settler R to the steeps A, the total amount of steep water being 9.3 gallons.

Because of the concentration of part of the mill starch by extraction of water therefrom, the mill starch is centrifuged at such gravity that the overflow therefrom will be only 10 gallons, of which 9.3 gallons goes to the steeping system. This gives a steep water draw-off of 5.6 gallons without sending any of the high solubles water or water which has stood in the settlers back to the starch washing separating operation; all of this highly infected water being discharged from the system through the steeps. The concentration of the mill starch from about 5°–7° Baumé to about 16° Baumé has the advantage of reducing the equipment of centrifugal machines, which are costly and more or less expensive to operate and maintain, besides facilitating the separation in each machine as between the starch and gluten, an operation which is quite difficult with a liquor of low gravity.

Other modifications will occur to those skilled in the art. It is the intention to cover all adaptations of the invention to industries other than the starch making industry as well as all changes in the disclosed system which are within the scope of the appended claims. However, no claim is made herein to the process disclosed in Fig. 1 of parent application Serial No. 674,365 (Patent #2,100,744) of which the present application is a division.

I claim:

1. The process of manufacturing starch from corn comprising: steeping and comminuting the corn; subjecting the comminuted corn to a series of separating operations in water, yielding separate mill starch streams differing in their solubles contents; centrifuging the mill starch having a high solubles content, after increasing the ratio of insolubles to water therein, to separate the gluten from the starch; utilizing in said centrifuging operation as a counter-current wash water mill starch having a lower solubles content;

and utilizing substantially all of the water in the overflow from said centrifuging operation for steeping corn as the operations are continued on fresh material.

2. The process of manufacturing starch from corn comprising steeping and comminuting the corn; subjecting the comminuted corn to a series of separating operations in water, yielding separate mill starch streams differing in their solubles contents; subjecting the mill starch having a high solubles content to a series of centrifuging operations in which the underflow carrying the starch moves in one direction and the wash water overflow, carrying the gluten, in the other direction, after increasing the ratio of insolubles to water therein; utilizing mill starch having a lower solubles content as a wash water in said centrifuging operations; utilizing the water in the overflow from the first of said centrifuging operations for steeping corn as the operations are continued on fresh material; and utilizing the overflow from another of said centrifuging operations in separating operations on the comminuted corn.

3. Method of treating bodies of mill starch having different solubles content to separate gluten and impurities from the starch which comprises: increasing the ratio of insolubles to water in the mill starch having the high solubles content; and subjecting this mill starch to a centrifuging operation in which mill starch having a lower solubles content is used as a wash water.

4. Method of treating bodies of mill starch having different solubles content to separate gluten and impurities from the starch which comprises: increasing the ratio of insolubles to water in the mill starch having high solubles content; and subjecting the mill starch to a centrifuging operation in which mill starch having a lower solubles content is used as a wash water and is introduced into the underflow zone of the centrifugal.

5. Method of treating bodies of mill starch having different solubles content to separate gluten and impurities from the starch which comprises: increasing the ratio of insolubles to water in the mill starch having high solubles content by extracting water from mill starch of lower solubles content and mixing the concentrated material with the first mentioned mill starch; and subjecting this mixture to a centrifuging operation in which mill starch having a lower solubles concentration is used as a wash water.

6. Method of treating bodies of mill starch having different solubles content to separate gluten and impurities from the starch which comprises: increasing the ratio of insolubles to water in the mill starch having high solubles content by extracting water from mill starch of lower solubles content and mixing the concentrated material with the first mentioned mill starch; and subjecting this mixture to a centrifuging operation in which mill starch having a lower solubles concentration is used as a wash water and is introduced into the underflow zone of the centrifugal machine.

7. Method of treating bodies of mill starch having different solubles content to separate gluten and imprities from the starch which comprises: increasing the ratio of insolubles to water in the mill starch having high solubles content; and subjecting this mill starch to a centrifuging operation in which mill starch having a lower solubles content is used as a wash water and subjecting the underflow from this centrifuging operation to a centrifuging operation in which fresh water is used as a wash water.

8. Method of treating bodies of mill starch having different solubles content to separate gluten and impurities from the starch which comprises: increasing the ratio of insolubles to water in the mill starch having high solubles content; and subjecting this mill starch to a centrifuging operation in which mill starch having a lower solubles content is used as a wash water; and subjecting the underflow from this centrifuging operation to a centrifuging operation in which fresh water is used as a wash water and in which part of its overflow is returned.

9. Method of treating bodies of mill starch having different solubles content to separate gluten and impurities from the starch which comprises: increasing the ratio of insolubles to water in the mill starch having high solubles content; and subjecting this mill starch to a centrifuging operation in which mill starch having a lower solubles content is used as a wash water and is introduced into the underflow zone of the centrifugal; and subjecting the underflow from this centrifuging operation to a centrifuging operation in which fresh water is used as a wash water and is introduced into the underflow zone of the centrifugal.

10. Method of treating bodies of mill starch having high, medium and low solubles content to separate the gluten and impurities from the starch which comprises: extracting water from the mill starch having the medium solubles content and adding the concentrated material to the mill starch having the high solubles content; and subjecting this mixture to a centrifuging operation in which the mill starch having the lowest solubles content is used as a wash water and is introduced into the starch zone of the centrifugal.

11. In the process of manufacturing starch from corn in which the corn after being steeped and comminuted is subjected to a series of separating operations, including a fine slop separation, which yields bodies of mill starch having different solubles content, the improvement which comprises: increasing the ratio of insolubles to water in the starch milk having high solubles content; subjecting this mill starch to a centrifuging operation in which the water in the mill starch is displaced by the water of mill starch of lower solubles concentration derived from the fine slop separation which is introduced into the centrifuging operation as a wash water; subjecting the underflow from this centrifuging operation to another centrifuging operation; filtering the starch from the second centrifuging operation with fresh water; and using the filtrate from said filtering operation as a wash water in said fine slop separation.

12. In the process of manufacturing starch from corn in which the corn after being steeped and comminuted is subjected to a series of separating operations, including a fine slop separation, which yields bodies of mill starch having different solubles content, the improvement which comprises: increasing the ratio of insolubles to water in the starch milk having high solubles content; subjecting this mill starch to a centrifuging operation in which the water in the mill starch is displaced by the water of mill starch of lower solubles concentration derived from the fine slop separation which is introduced into the centrifuging operation as a wash water; subjecting the underflow from this centrifuging operation to another centrifuging operation, using fresh water; filtering the starch from the second centrifuging operation with fresh water; and using the filtrate from said filtering operation as a wash water in said fine slop separation.

13. In the process of manufacturing starch from corn in which the corn after being steeped and comminuted is subjected to a series of separating operations, including a fine slop separation, which yields bodies of mill starch having different solubles content, the improvement which comprises: increasing the ratio of insolubles to water in the starch milk having high solubles content; subjecting this mill starch to a centrifuging operation in which the water in the mill starch is displaced by the water of mill starch of lower solubles concentration derived from the fine slop separation which is introduced into the centrifuging operation as a wash water; subjecting the underflow from this centrifuging operation to another centrifuging operation, using fresh water; filtering the starch from the second centrifuging operation with fresh water; using the filtrate from said filtering operation as a wash water in said fine slop separation; and returning part of the overflow from the second centrifuging operation back to such operation.

14. In the process of manufacturing starch from corn in which the corn after being steeped and comminuted is subjected to germ, coarse slop and fine slop separations, the improvement which comprises: extracting water from the mill starch from the coarse slop separation and adding the concentrated material to the mill starch from the germ separation; subjecting this mixture to a centrifuging operation in which the mill starch from the fine slop separation is used as a wash water and is introduced into the starch zone of the centrifugal; returning substantially all of the water in the overflow from this centrifuging operation to the steeping operation; subjecting the underflow from said centrifuging operation to another centrifuging operation in which fresh water is used as a wash water; filtering the starch from the second centrifuging operation; and using the filtrate from the filtering operation as a wash water in the fine slop separation.

15. In the process of manufacturing starch from corn in which the corn after being steeped and comminuted is subjected to germ, coarse slop and fine slop separations, the improvement which comprises: extracting water from the mill starch from the coarse slop separation and adding the concentrated material to the mill starch from the germ separation; subjecting this mixture to a centrifuging operation in which the mill starch from the fine slop separation is used as a wash water and is introduced into the starch zone of the centrifugal; returning substantially all of the water in the overflow from this centrifuging operation to the steeping operation; subjecting the underflow from said centrifuging operation to another centrifuging operation in which fresh water is used as a wash water; filtering the starch from the second centrifuging operation; using the filtrate from the filtering operation as a wash water in the fine slop separation; using overflow from the second centrifuging operation as a wash water for the coarse slop separation; and using water extracted from the coarse slop mill starch in the germ system.

ALFRED H. KELLING.